United States Patent [19]

Bell

[11] 4,116,132

[45] Sep. 26, 1978

[54] INERTIAL SENSORS

[75] Inventor: Lon E. Bell, Altadena, Calif.

[73] Assignee: Technar Incorporated, Calif.

[21] Appl. No.: 751,880

[22] Filed: Dec. 17, 1976

[51] Int. Cl.² .................... F42C 1/04; H01H 35/14
[52] U.S. Cl. .............................. 102/200; 102/272; 200/61.53
[58] Field of Search .............. 102/70.2 R, 70.2 A, 102/70.2 G, 70.2 GA, 39, 78, 73 R; 280/728, 731, 734, 735; 200/61.45, 61.53, 61.54, 61.55, DIG. 39, DIG. 45

[56] References Cited

U.S. PATENT DOCUMENTS

| Re. 28,251 | 11/1974 | Bell | 200/61.53 |
|---|---|---|---|
| 1,292,505 | 1/1919 | Newell | 102/73 R |
| 1,473,355 | 11/1923 | Pillars et al. | 102/78 |
| 2,703,530 | 3/1955 | McGee | 102/70.2 GA |
| 2,977,881 | 4/1961 | Piper | 102/70.2 G |
| 3,410,214 | 11/1968 | Irion | 102/78 |
| 3,452,175 | 6/1969 | Wilkes | 200/61.45 R |
| 3,727,575 | 4/1973 | Prachar | 280/734 |
| 3,848,695 | 11/1974 | Lacaze, Jr. | 280/735 |
| 3,859,650 | 1/1975 | Prachar | 280/735 |
| 3,859,746 | 1/1975 | Pecksen | 102/70.2 GA |

Primary Examiner—Charles T. Jordan
Attorney, Agent, or Firm—Roger H. Criss; Ernest D. Buff

[57] ABSTRACT

The sensor includes a linearly movable mass including two sections and spring means urging one of the sections into operative engagement with means including an actuating element. The sensor also includes means releasably securing the two sections together and means releasing the securing means when the two sections have moved a predetermined distance against the urging of the spring. The two sections may be rollers of a rolamite unit. A flexible band extends around a portion of the two rollers. One example of a use for such a sensor is in an air bag safety restraint system.

18 Claims, 8 Drawing Figures

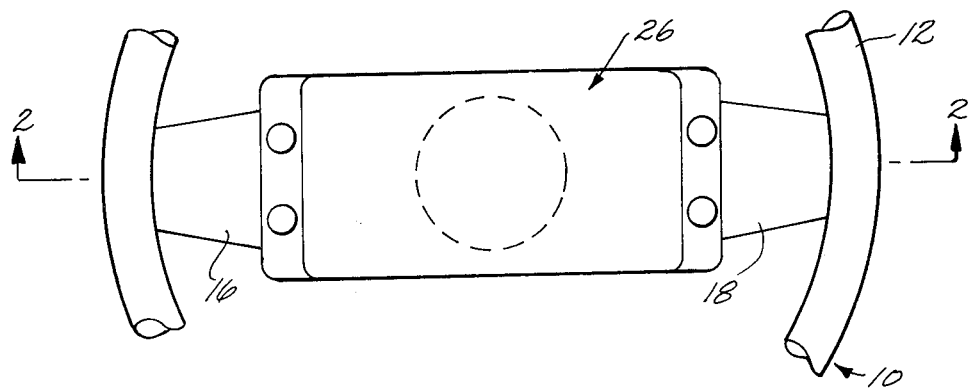
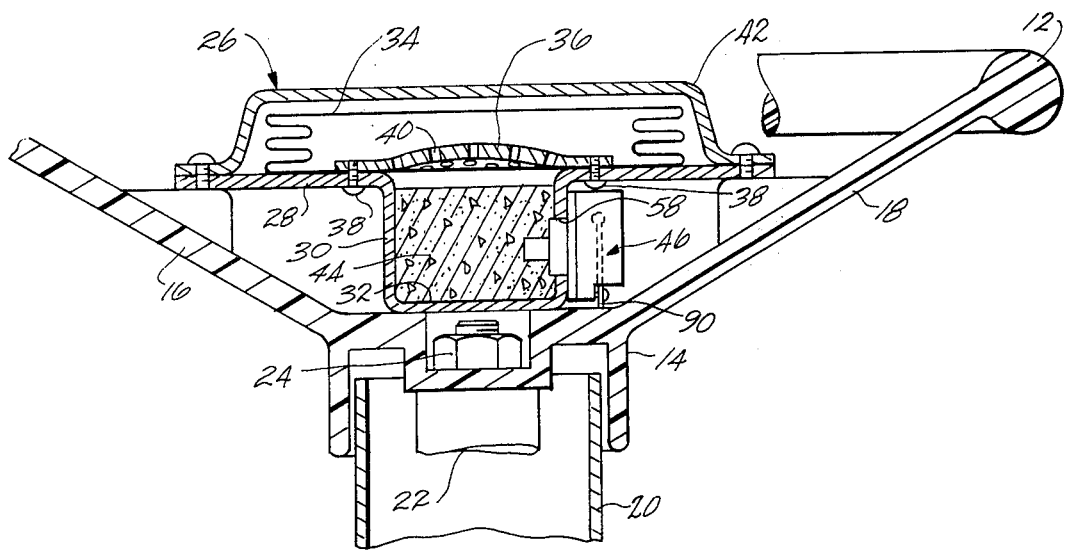

INERTIAL SENSORS

BACKGROUND OF THE INVENTION

The present invention relates to inertial sensors such as for sensing a change in acceleration or deceleration. The sensors may be used in a wide variety of applications, such as in a vehicle safety system. For example, the sensors may be used to cause inflation on an air bag in a vehicle when the vehicle is subjected to deceleration above a predetermined amount.

Other designs of deceleration sensors or related apparatus are disclosed in the following U.S. Pat. Nos. 3,812,726; 3,688,063; Re 28,251 and 3,889,232 to L. Bell; 3,452,175; 3,452,309; 3,471,668; and 3,572,141 to D. Wilkes; and 3,567,881 to F. Dulmstra; and in U.S. patent application Ser. Nos. 751,859 and 751,858 both filed Dec. 17, 1976.

SUMMARY OF THE INVENTION

The sensors of the present invention include a linearly movable mass having two sections and spring means urging one of the sections into operative engagement with means including an actuating element. The sensors also include means releasably securing the two sections together and means releasing the securing means when the two sections have moved a predetermined distance against the urging of the spring. The two sections may be rollers of a rolamite unit. A flexible band extends around a portion of the two rollers. One example of a use for such a sensor is in an air bag safety restraint system. The sensors may also include an interlock means which prevents the sensors from being actuated inadvertently. In addition, the sensors include fail-safe features which prevent activation by failure or malfunction of the mechanisms.

DESCRIPTION OF THE DRAWINGS

FIG. 1 is a plan view of an air bag safety restraint system in which the sensors of the present invention may be used.

FIG. 2 is a sectional view taken substantially along the line 2—2 of FIG. 1.

DETAILED DESCRIPTION

Figure 3:
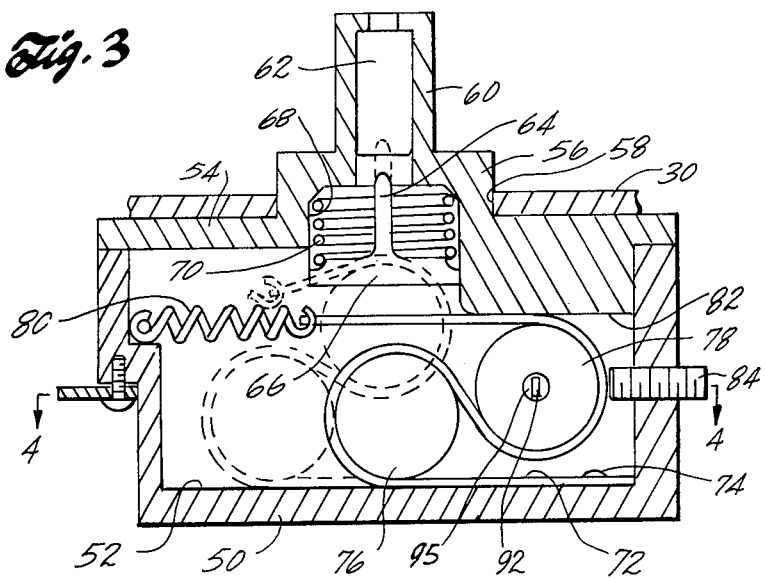
FIG. 3 is a sectional view of a sensor element used in the safety restraint system of FIGS. 1 and 2.

Referring to FIGS. 1 and 2, an example of a use for the sensors of the present invention is in an air bag safety restraint system mounted on a steering wheel, indicated generally at 10, of an automobile. The steering wheel 10 includes an outer rim 12, a central hub section 14, and a pair of diametrically opposed radial spokes 16 and 18. The hub section 14 extends around a steering column 20. The central portion of the hub 14 is bolted or otherwise secured to the end of a steering shaft 22 by means of a nut 24 in conventional manner.

The air bag safety system, indicated generally at 26, is mounted within the rim of the steering wheel directly over the central hub 14. The safety system includes a frame plate 28 having a cylindrical cup-shaped portion 30 in the center. The outer ends of the frame plate 28 are bolted or otherwise secured to the steering spokes 16 and 18 in any suitable manner, with the bottom 32 of the cup-shaped portion 30 resting against the central hub 14.

A folded air bag 34 has a mouth forming a circular opening which is sealed to the frame plate 28 around the top of the cup-shaped portion 30. A diffuser plate 36 extends across the top of the cup-shaped portion 30. The air bag 34 is clamped securely around the margin of the mouth of the bag to form a seal between the diffuser plate 36 and the frame plate 28. The diffuser plate is held in place by a plurality of screws 38. The central portion of the diffuser plate 36 extending over the cup-shaped portion 30 is provided with a plurality of small openings 40. A suitable cover 42 made of a frangible plastic material encloses and protects the folded air bag 34 to prevent damage to the bag when it is in its stored, uninflated condition.

The cup-shaped portion 30 is filled with a gas generating material, such as sodium azide. This material is stable over a wide range of temperatures, but when heated above 700° C., rapidly decomposes, releasing a large volume of nitrogen gas. However, the present invention in no way is limited to a specific material used for gas generating, but may use other forms of pyrotechnic gas generators, high pressure gas reservoirs, or hybrid systems which combine compressed gases with a gas generator.

Figure 4:
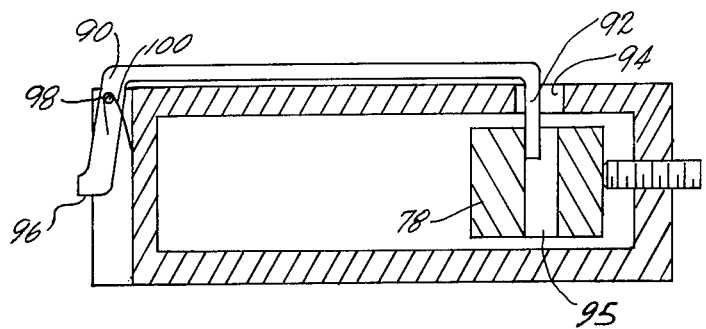
FIG. 4 is a sectional view taken substantially on the line 4—4 of FIG. 3.

The gas generating source 44 is ignited in response to a crash sensing element 46 mounted on the side of the cup-shaped portion 30 of the frame plate 28. The sensor 46 may take a variety of forms in which a housing containing an inertial element, in response to a decelerating force having a component acting along the axis of the steering column, produces relative movement between the inertial element and the housing, moving relative to the housing with sufficient energy to trigger means for igniting the gas generator source. A preferred sensor unit is shown in detail in FIGS. 3 and 4.

The sensor of the present invention includes a housing 50 having a hollow interior forming a first flat interior surface 52. The housing 50 has an opposite wall 54 which includes a hollow cylindrical portion 56 designed to press-fit or otherwise be secured in a hole 58 in the side of the cup-shaped portion 30 of the frame plate 28 with the surface 52 extending parallel to the axis of rotation of the steering wheel. A tubular portion 60 projects from the end wall of the cylindrical portion 56 and contains a primer/initiator 62. Tubular portion 60 is preferably open on the end and projects into the material forming the gas generating source 44. A firing pin 64 projecting from a disc 66 is supported in a bore 68 within the cylindrical portion 56 by a coil compression spring 70.

A rolamite-type sensor element is provided which includes an elongated spring band 72 secured at one end against the surface 52 by a screw or pin 74. The band extends around the first cylindrical roller 76 and in a reverse band around a second cylindrical roller 78. A tension spring 80 secures the other end of the band 72 to the housing 50, with the band 72 maintained under tension by the spring. The tension in the band presses the band against a second interior flat surface 82 extending parallel to the surface 52. By shaping the band in the manner described in detail in U.S. Pat. No. Re 28,251, the spring band 72 produces a net force on the rollers 76 and 78, urging them against an adjustable stop in the form of a calibration screw 84. Any force acting on the rollers in the direction of the arrow causes the rollers to overcome this net force produced by the band 72, causing the rollers to move to the left as viewed in FIG. 3. If the force is of sufficient magnitude and sustained for a sufficient period of time, the rollers will move to the dotted position in which the tension on the band produced by the spring 80 causes the roller to move upwardly against the disc 66, thereby forcing the firing pin 64 into firing engagement with the primer/initiator 62. This initiates the chemical reaction in the gas generator source 44, releasing gas in sufficient quantity to inflate the air bag 34, causing the air bag to break out of the cover 42 and expand into the passenger compartment.

A safety interlock arrangement prevents the rollers 76 and 78 from moving inadvertently when the safety unit is not in use. The interlock is automatically released when the safety unit is mounted in position on the steering wheel, as shown in FIG. 2. The safety interlock includes a generally L-shaped lever 90, one leg of which extends along the outside of the sensor housing 50 and terminates in a projecting pin 92 which extends through an opening 94 in the housing. The pin 92 is sufficiently long to project into an opening 95 extending through the center of the roller 78. The other leg of the L-shaped safety lever terminates in a projection 96 which is positioned to engage the hub portion of the steering wheel when the safety system is properly mounted. The L-shaped lever 90 is pivotally supported by a pin 98 so that a pressure against the projection 96 causes the lever to pivot in a direction to withdraw the pin 92 from the hole 95 in the roller 78. A wire coil spring 100 wrapped around the pivot pin 98 normally urges the pin 92 down into the hole 95 to lock the roller 78. When the safety unit is in position against the hub of the steering wheel, the action of the spring 100 is overcome and the pin 92 is automatically withdrawn, freeing the rollers 76 and 78 to move in the manner described above. When the unit is dismounted, the pin 92 automatically locks the roller 78 again.

The sensor element as described, in addition to the safety pin arrangement for automatically arming the unit when it is mounted in proper position, has other fail-safe features to its design. If the band 72 should break, for example, or the tension spring 80 fails, the sensor automatically becomes inoperative and there can be no firing of the primer/initiator 62. It should be noted that the guide surfaces 52 and 82 for the rollers are aligned parallel to the axis of rotation of the steering shaft so that the sensor is unaffected by the angular position of the steering wheel in sensing a crash condition.

From the above description, it will be seen that the sensor is self-contained and does not require an outside source of energy, such as electrical power. The energy required by the sensor is stored in the form of tension in the spring 80.

Figures 5, 6:
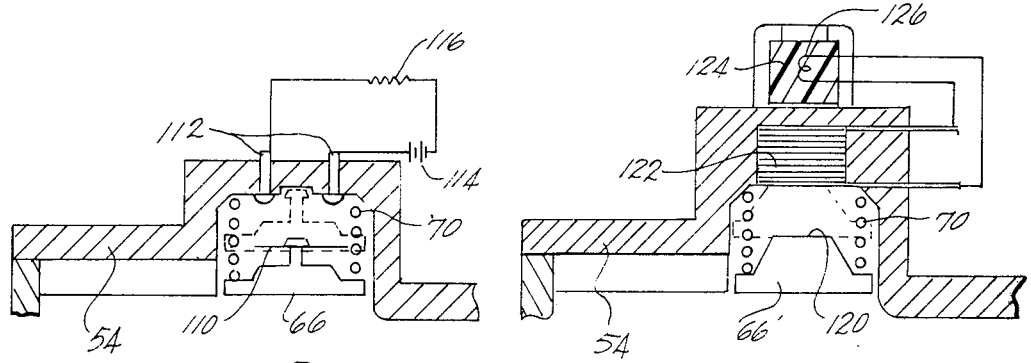
FIG. 5 shows a modification of the sensor unit of FIG. 3.
FIG. 6 shows a further modification of a sensor element.

While the use of a primer/initiator which is triggered by a mechanical impact is preferred, it will be understood that a bridge wire initiator may be used. If such a hot wire initiator is employed, a separate battery for providing electrical energy to the hot wire is required. A battery having a long shelf life can be mounted as part of the safety unit. The hot wire initiator can then be triggered from the battery by means of a switch, such as shown in FIG. 5. In the modification of FIG. 5, the disc 66 moves a contact spring 110 into contact with a pair of switch pins 112. Thus, a circuit is completed between a battery 114 and a hot wire 116 in the initiator.

Rather than utilizing a separate battery, the electrical energy to trigger the bridge wire initiator may be generated by a piezoelectric stack or electromagnetic coil. As shown in FIG. 6, the disc 66' is modified to have a larger mass and provide a substantially flat surface 120. When the disc 66' is moved by the rollers against the spring 70, it impacts a stack of piezoelectric crystals, indicated at 122. The piezoelectric crystals under the impact of the disc 66' provide sufficient electrical energy to fire an initiator 124 by means of a hot wire 126 connected across the piezoelectric crystal stack 122.

Figure 7:
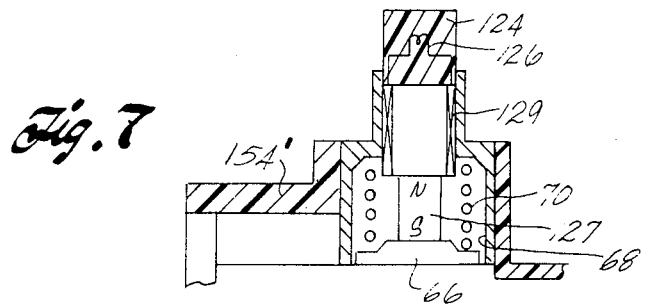
FIG. 7 shows a further modification of the sensor element.

Referring to FIG. 7, there is shown a further embodiment of the sensor utilizing an electromagnetic generator for firing the pyrotechnic device. This is accomplished by mounting a permanent magnet 127 on the disc 66. A wire coil 129 is axially aligned with the magnet so that when the disc is moved by the roller 78 in the manner described above in connection with FIG. 3, the magnet 127 advances into the center of the coil 129, generating a current through the hot wire 126 to fire the pyrotechnic device 124. The portion of the housing 154' which surrounds the coil and forms the bore 68 is preferably made of ferromagnetic material to provide a low reluctance magnetic path for the flux from the magnet 127.

Figure 8:
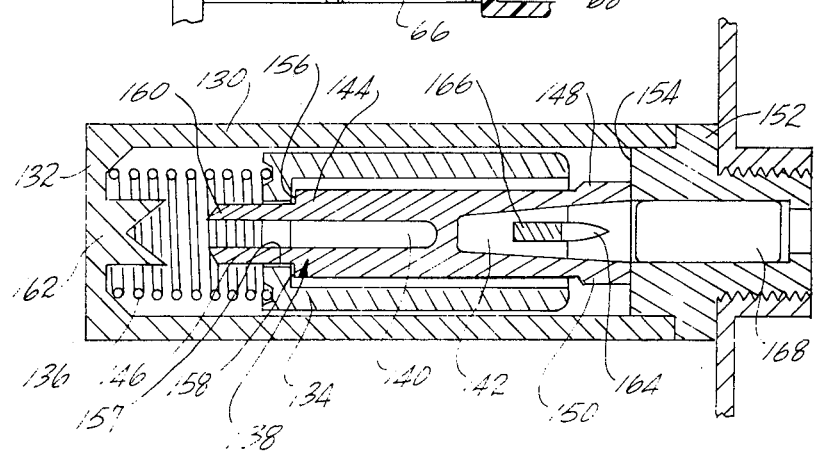
FIG. 8 shows yet another embodiment of the sensor element.

Referring to FIG. 8, there is shown an alternative sensor element which includes a tubular housing 130 having an end wall 132. Slidably mounted within the tubular housing 130 is an annular bushing 134. A compression spring 136 engages the end of the bushing 134 urging it away from the end wall 132 of the housing. Concentrically positioned inside the annular bushing 134 is a latch member 138 in the form of a shaft which is slotted at either end, as indicated at 140 and 142. The slot 140 forms a pair of fingers 144 and 146. The slot 142 forms a pair of fingers 148 and 150. The mounting plug 152 is inserted in the end of the tubular housing 130 forming an inner wall 154 which is engaged by the ends of the fingers 148 and 150. The fingers 144 and 146 are formed with a shoulder 156 and 158, respectively, which engage a lip 157 on the end of the bushing 134. The spring 136 holds the lip against the shoulders 156 and 158, thereby urging the latching member 138 toward the plug 152.

The ends of the fingers 144 and 146 are tapered at the ends, as indicated at 160. Any sudden deceleration of the housing 130 allows the inertial mass of the bushing and latch member to compress the spring 136, bringing the tapered ends 160 into engagement with a tapered V-shaped wedging member 162 projecting from the end wall 132. The wedging action of the impact between the latching member 138 and the wedging member 162 forces the fingers 144 and 146 to move together. This causes the shoulders 156 and 158 to disengage from the lip 157 on the end of the bushing, thereby releasing the bushing to move relative to the latching member 138 under the urging of the spring 136. A firing pin 164 is positioned in the slot 142 and is supported from the bushing 134 by a supporting cross bar 166. The firing pin 164, on release of the bushing from the latch member 138, is brought into contact with a primer/initiator 168 mounted in the plug 152. By mounting the sensor unit in the bottom of the cup-shaped portion 30 in which the chemical gas generating source is located, the primer/initiator, when fired, ignites the gas generating source to inflate the air bag in the manner described above.

The sensor of FIG. 8 is inherently fail-safe in that the spring 136 in the initial condition shown in the drawing does not store sufficient energy to activate the primer, even if the latch should fail to hold the bushing in place. Only when the spring 136 is compressed by the inertia of the combined mass of the bushing and the latching member during a crash does the spring 136 become fully compressed and store sufficient energy to drive the bushing and firing pin with great enough force to activate the primer. Thus, there is no way for the primer to be fired except by the cocking and subsequent release action experienced on impact in a crash situation.

The sensor of FIG. 8, like the sensors of FIGS. 3-7, do not require connection to any external unit or power source, and therefore can be considered self-energized. Only acceleration or deceleration of the sensor is needed to activate the unit.

What is claimed is:

1. A sensor responsive to a predetermined level of acceleration force or deceleration force acting on an associated structure when said sensor is properly mounted to said structure, said sensor comprising:
   a linearly movable mass including a first section;
   firing means including a firing element for actuation of a mechanism;
   means urging said first section into operative engagement with said firing means;
   mounting means for mounting said sensor to said associated structure;
   releasable safety interlock means normally preventing said mass from operative engagement with said firing means; and
   means for automatically releasing said safety interlock means upon proper mounting of said sensor to said associated structure.

2. The sensor of claim 1 wherein said sensor includes a source of electrical energy, means releasing said energy in response to the presence of said predetermined level of force, and means for activating said mechanism in response to said electrical energy.

3. The sensor of claim 2 wherein said source of electrical energy is piezoelectric device.

4. The sensor of claim 2 wherein said source includes a coil, and a magnet movable relative to the coil by said energy releasing means.

5. The sensor of claim 2 wherein said mechanism is a pyrotechnic device, said source of electrical energy is a battery, and said means releasing the energy includes a switch connecting the source to the pyrotechnic device.

6. The sensor of claim 1 wherein said linearly movable mass includes a second section, said means urging said first section into operative engagement with said firing means comprising a spring means, and wherein said sensor further comprises means releasably securing said first and second sections together, and means releasing said securing means when said two sections have moved a predetermined distance against the urging of said spring means.

7. The sensor of claim 1 wherein said linearly movable mass comprises a rolamite means.

8. The sensor of claim 7 wherein said rolamite means comprising a pair of rollers, and further comprising a flexible band extending around a portion of said rollers, a housing having parallel surfaces engaging said band on either side of said rollers, said urging means comprising means applying tension to said band to urge said rollers and band against said surfaces, said rollers being free to roll along said band, one of said surfaces terminating at an edge, plunger means movable perpendicular to said surfaces, and means positioned adjacent said edge and actuating said plunger means when said rollers move beyond said edge.

9. The sensor of claim 8 further including a pyrotechnic device, and means activated by the plunger means for firing the pyrotechnic device.

10. The sensor of claim 9 wherein the means for firing the pyrotechnic device includes a firing pin and a primer activated on impact by the pin.

11. The sensor of claim 9 wherein the means for firing the pyrotechnic device includes a piezoelectric stack engaged by the plunger means, a hot wire connected across the stack and in contact with the pyrotechnic device, the electrical energy from the stack when hit by the plunger means heating the hot wire to fire the pyrotechnic device.

12. The sensor of claim 9 wherein the means for firing the pyrotechnic device includes a switch operated by the plunger means, a battery, and a hot wire connected across the battery by the switch and in contact with the pyrotechnic device.

13. The sensor of claim 9 wherein the means for firing the pyrotechnic device includes a wire coil, a hot wire connected across the coil and in contact with the pyrotechnic device, and a magnet movable in relation to the coil by the plunger means.

14. The sensor of claim 1 wherein said releasable safety interlock means comprises a lever, a first portion of said lever releasably engaged with said linearly movable mass and a second portion of said lever adapted for engagement with and movement by said associated structure when said sensor is properly mounted on said structure, movement of said second portion upon proper mounting on said structure causing movement of said first portion to release said linearly movable mass and permit said mass to move in response to said predetermined level of acceleration or deceleration.

15. The sensor of claim 14 wherein said mass comprises a rolamite means, means on said rolamite means for releasable engagement with said first portion of said lever, and means for automatically re-engaging said releasable safety interlock means upon removal of said sensor from said associated structure.

16. A mechanical sensor without any source of electrical power responsive to deceleration for actuating a pyrotechnic device, said sensor comprising:
    a movable mass;
    spring means urging the mass in one direction, deceleration causing said mass to move against the urging of the spring means; and
    means associated with said mass for actuating the pyrotechnic device in response to the urging of the spring means.

17. The sensor of claim 16 wherein the mass includes a first movable section and a second movable section, releasable means for normally locking the two sections together, and means releasing the two sections when the two sections have moved a predetermined distance against the urging of the spring means, the spring means being connected only to said first section.

18. The sensor of claim 17 wherein said first section of said mass comprises an annular bushing provided with a firing means, said second section of said mass comprising a shaft positioned inside said annular bushing, said releasable means comprising cooperatively engaging portions of said first and second sections; a housing for said sensor; contact means on said housing; contact means on said second section of said mass for engaging said contact means on said housing upon said deceleration and thereby releasing said cooperatively engaging portions of said first and second sections, said annular bushing being moved by said deceleration against the bias of said spring means to thereby store energy in said spring means and being moved by said spring means to actuate said pyrotechnic device upon release of said cooperatively engaging portions.

* * * * *